(12) United States Patent
Egner-Walter

(10) Patent No.: US 6,168,223 B1
(45) Date of Patent: Jan. 2, 2001

(54) WINDSCREEN WIPER SYSTEM FOR VEHICLES

(75) Inventor: Bruno Egner-Walter, Hielbronn (DE)

(73) Assignee: ITT Manufacturing Enterprises, Inc., Wilmington, DE (US)

( * ) Notice: Under 35 U.S.C. 154(b), the term of this patent shall be extended for 0 days.

(21) Appl. No.: 09/462,758

(22) PCT Filed: Apr. 27, 1999

(86) PCT No.: PCT/EP99/02822

§ 371 Date: Jan. 12, 2000

§ 102(e) Date: Jan. 12, 2000

(87) PCT Pub. No.: WO00/06429

PCT Pub. Date: Feb. 10, 2000

(30) Foreign Application Priority Data

Jul. 24, 1998 (DE) .............................................. 198 33 404

(51) Int. Cl.[7] ...................................................... B60J 1/02
(52) U.S. Cl. .................................. 296/96.17; 296/97.15; 15/250.44; 15/250.29
(58) Field of Search ........................... 296/96.15, 96.17; 15/250.44, 250.29, 97.3

(56) References Cited

U.S. PATENT DOCUMENTS

| | | |
|---|---|---|
| 2,808,139 | 10/1957 | Bowers . |
| 2,880,444 * | 4/1959 | Barenyi et al. ..................... 15/250.29 |
| 3,583,021 * | 6/1971 | Druseikis ............................ 15/250.29 |
| 3,606,629 * | 9/1971 | Parker ................................. 15/250.29 |
| 3,893,204 * | 7/1975 | Kolb ................................... 15/250.23 |
| 4,435,875 * | 3/1984 | Hauk .................................. 15/250.23 |
| 4,770,462 * | 9/1988 | Kuraoka et al. ................... 296/96.15 |
| 4,773,117 * | 9/1988 | Saito .................................. 296/96.15 |
| 5,005,249 * | 4/1991 | Nishizawa et al. ............... 15/250.29 |
| 5,203,602 * | 4/1993 | Eustache ........................... 296/96.15 |
| 5,274,875 * | 1/1994 | Chou ................................. 296/96.15 |
| 5,381,582 * | 1/1995 | Lee et al. .......................... 296/96.15 |
| 5,504,966 * | 4/1996 | Lee et al. .......................... 296/96.15 |
| 5,621,942 * | 4/1997 | Eustache et al. ................. 296/96.15 |

FOREIGN PATENT DOCUMENTS

| | | |
|---|---|---|
| 40 36 367 | 5/1992 | (DE) . |
| 43 23 551 | 1/1994 | (DE) . |
| 1368673 | 12/1964 | (FR) . |
| 2 228 188 | 8/1990 | (GB) . |

* cited by examiner

Primary Examiner—Joseph D. Pape
Assistant Examiner—Kiran Patel
(74) Attorney, Agent, or Firm—J. Gordon Lewis

(57) ABSTRACT

A windshield wiper arrangement for vehicles, particularly for motor vehicles, is described which makes possible a non-screw type mounting and thus a mounting which is to be carried out in a simple and rapid manner. For this purpose, the windshield wiper arrangement has a support structure (3) which carries the one windshield wiper drive device (4). At the support structure (3), a first number of attachment members (14), (15) are provided which protrude in a first direction (17) from the support structure (3) and a second number of attachment members (16) which protrude in a second direction (19) from the support structure (3), wherein the second direction (19) extends at an angle between 45° and 135° with respect to the first direction (17), preferably at an angle of approximately 90°.

17 Claims, 2 Drawing Sheets

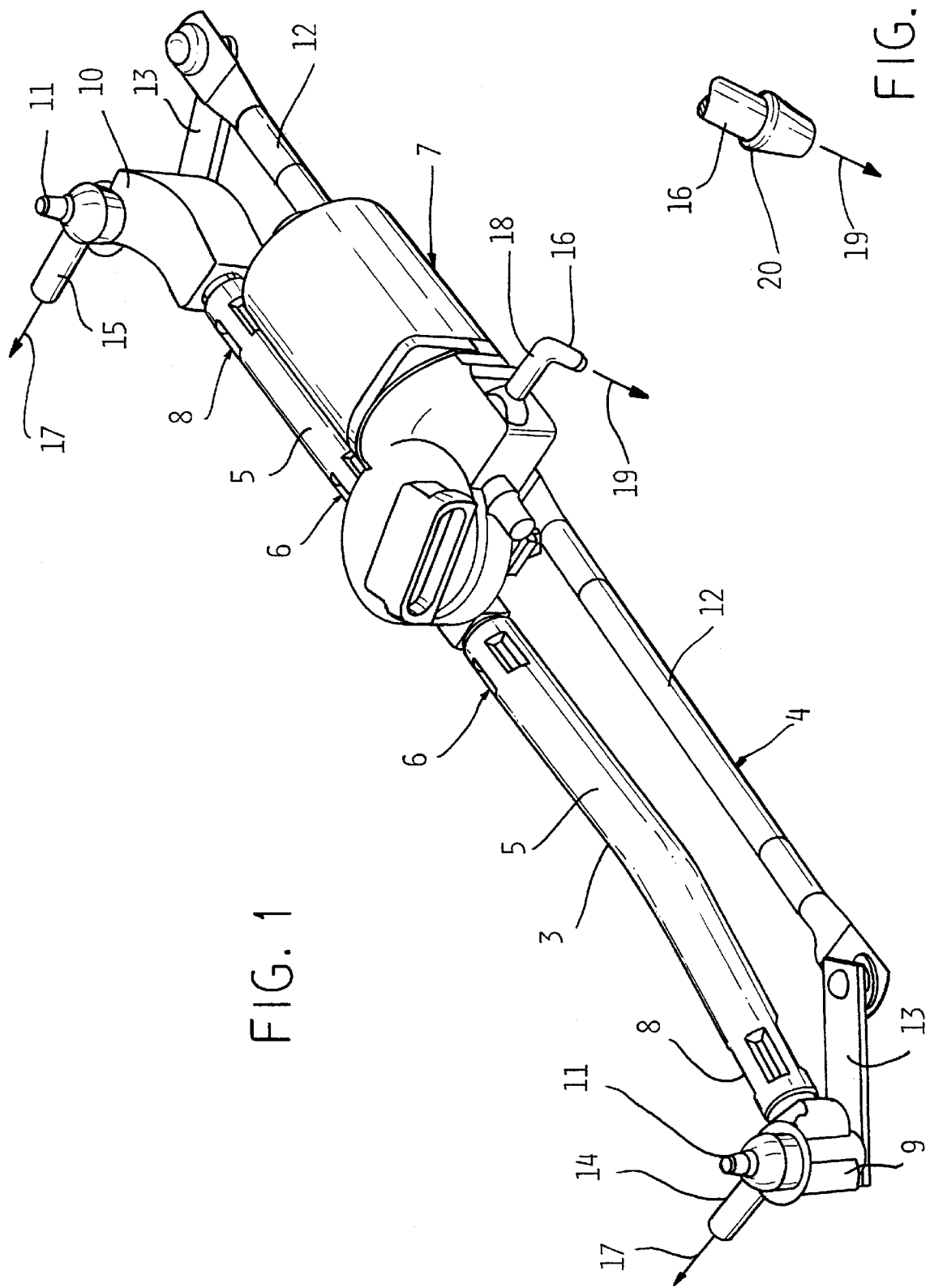

WINDSCREEN WIPER SYSTEM FOR VEHICLES

BACKGROUND OF THE INVENTION

The invention relates to a windshield wiper system for vehicles, particularly, motor vehicles.

A windshield wiper arrangement of this type is known from DE 4036367 A1. It has an elongated support structure accommodating a windshield wiper drive device which, in the area of its two ends, carries at respectively one attachment point an attachment member with the aid of which the support structure can be attached at one part of the vehicle body. These attachment members are formed by screws which are parallel to each other, are arranged so they can be turned, and which are axially secured and which extend in the same direction, wherein the screws are to be screwed on the body side into threaded bore holes. As a rule, windshield wiper arrangements of this type have at least one additional attachment point at which as an additional attachment member, also a screw or a peg, is provided which can be inserted into a receiving opening on the body side in a form-locking manner.

This type of attachment requires a correspondingly expensive, special bearing and a mounting of the screws at the attachment points of the support structure, as well as a screwing-on of the attachment screws to the vehicle body which is time-consuming and at the same time cost-intensive.

It is the task of the invention to simplify a windshield wiper arrangement with respect to the manufacturing technology as well as the mounting technology.

SUMMARY OF THE INVENTION

This windshield wiper arrangement, due to its construction in accordance with the invention, with extendable attachment members protruding from the support structure to be mounted at all attachment points of the support structure, can be mounted in a rapid manner and by means of a simple movement with the aid of a screwless plug connection at a vehicle body. Through the use of plug-in attachment members at all of the attachment points, a secure premounting of attachment screws at the support structure, in accordance with the initially described state of the art, is also omitted. This results in a simplification with respect to manufacturing technology as well.

By means of an embodiment wherein the second number of attachment members protrudes into a second direction from the support structure, extending at an angle of 45° to 135°, preferably approximately 90°, with respect to the first direction of the first number of attachment members, the first number of attachment members—due to this arrangement—is axially secured to prevent a release of same from their plug-in openings at the vehicle body.

One embodiment of the invention assures a stable attachment of the windshield wiper arrangement at the vehicle body with respect to the axial direction of at least one wiper shaft, so that an appropriate pressing force of the wiper blade against the vehicle's windshield is assured.

For this purpose, one development provides a particularly simple maneuver during the mounting or removal of the windshield wiper arrangement at the vehicle or from the vehicle wherein, furthermore, it is assured that the first attachment members are optimally secured in their receiving openings at the vehicle body. During mounting, at first the windshield wiper arrangement with the first number of attachment members, in a position which is at an angle with respect to the central axes of the receiving openings, is pushed into the assigned receiving openings at the vehicle body. After an appropriate depth of insertion has been reached which may advantageously be limited or defined by an appropriate stop, the windshield wiper arrangement is merely pivoted diagonally with respect to the first direction of insertion, whereby the second number of attachment members is made to engage the assigned receiving openings. Also, in the case of the second number of attachment members, stops would provide a further simplification of the mounting. The dismounting would occur in the same simple manner with a reversed course of movement.

A development provides that the attachment members are plug-in pegs of preferably cylindrical form. This is an optimally simple constructive and material-saving embodiment of the attachment members which nonetheless assures a secure and stable attachment of the windshield wiper arrangement. The insertion pegs can be rigidly mounted at the support structure in a simple way by welding on or by a press-plug connection. In order to accommodate the latter at the vehicle body, cylindrical bore holes suffice, only two of them being provided with sufficiently tight tolerances to ensure a non-rattling holding of the mounting device.

One embodiment of the invention with attachment members formed in one piece with the support structure or parts of the support structure, permits a simple and cost-efficient manufacture.

An arrangement of the attachment members at the support structure assures a "mounting-friendly" and simple attachment, in accordance with the manufacturing technology, of the attachment members at the support structure or a part of the support structure. Furthermore, this arrangement of the attachment members at the opposing external sides or the opposing longitudinal sides of the support structure, with respect to the forces in effect during the wiper operation, is advantageous for a secure mounting, particularly because with respect to the geometric conditions of the windshield wiper arrangement an optimally great distance between the first and the second number of attachment members is given in this way.

One embodiment of the invention is recommended for, above all, those cases in which the number of the first attachment members is greater than two due to the fact that the windshield wiper arrangement extends largely in the longitudinal direction. This can occur most of all in the case of windshield wiper arrangements with more than two wiper shafts which are provided, for example, for use in a bus or truck. The arrangement of these attachment members along a straight or nearly straight connecting line makes possible a simpler introduction into the assigned receiving openings and assures the required pivotability of the windshield wiper arrangement during its attachment or removal for the introduction or removal of the second number of attachment members into or from the receiving openings.

A development is advantageous with respect to a simple and cost-efficient manufacture. Furthermore, it is thereby assured that the windshield wiper arrangement or its support structure is connected with the vehicle body at a location of the most varied force influences, which is advantageous for a permanent secure attachment and precise wiper movements on the vehicle windshield. These advantages are applicable also in transferred form to an arrangement wherein hereby a relatively great lateral distance with respect to the connecting line of the first attachment members as well as an advantageous plug engagement of this attachment, provided at the drive aggregate, inside the receiving opening assigned to it can be achieved.

A development of the invention is preferred because same can achieve, at an advantageously low manufacturing and mounting cost, a safely operating attachment of the windshield wiper arrangement at the vehicle, wherein by means of a development of the construction of the invention, with respect to an optimum force distribution, an advantageous support basis of the windshield wiper arrangement at the vehicle body can be achieved. In connection with one of the developments, as viewed at that point, a development of the invention for a windshield wiper arrangement solves the initially given problem in the best manner.

In this connection, it should be pointed out that from DE 44 136 35 A1, a windshield wiper system is already known which is supported via three attachment points at vehicle body parts, which attachment points are located at the corners of a triangle. Two of the attachment points are provided laterally at the windshield wiper arrangement and are to be rigidly connected with corresponding attachment parts with a support wall of the vehicle body. In accordance with a preferred embodiment, the third attachment point is defined by a structurally expensive holding element which can be built on and which carries a rubber sleeve into which a holding element, protruding from the wiper arrangement, can be inserted. Also, in the case of this construction, the attachment device cannot be mounted by means of a non-screw type plug connection.

An advantageous arrangement of the invention, due to the thickening at the free end of at least one of the second number of attachment members, provides that this attachment member or the second number of attachment members is axially secured.

A manufacturing-specific offset of receiving openings at the vehicle body or possibly also of the attachment members does not have a disadvantageous effect.

Finally, it is advantageous for the purpose of achieving a decoupling in accordance with the oscillations of plug components which are to be mutually engaged, to provide the receiving openings at the vehicle body with a damping element. Due to the elasticity of such a rubber sleeve, despite an otherwise tight fit, the insertion or the retrieval of the first number of attachment members at an angle with respect to the central axes of the receiving openings is made possible. Furthermore, such a rubber sleeve may interact with a thickened area at the respective attachment member in the manner of a catch serving as an axial safety device.

BRIEF DESCRIPTION OF THE DRAWING

A preferred example of the invention is described in the following by means of the illustration in which:

FIG. 1 shows a graphic representation of a windshield wiper system with a support structure and a windshield wiper drive device;

FIG. 1 a shows a special arrangement of an attachment member provided at the support structure;

DESCRIPTION OF THE PREFERRED EMBODIMENTS

Figure 3:
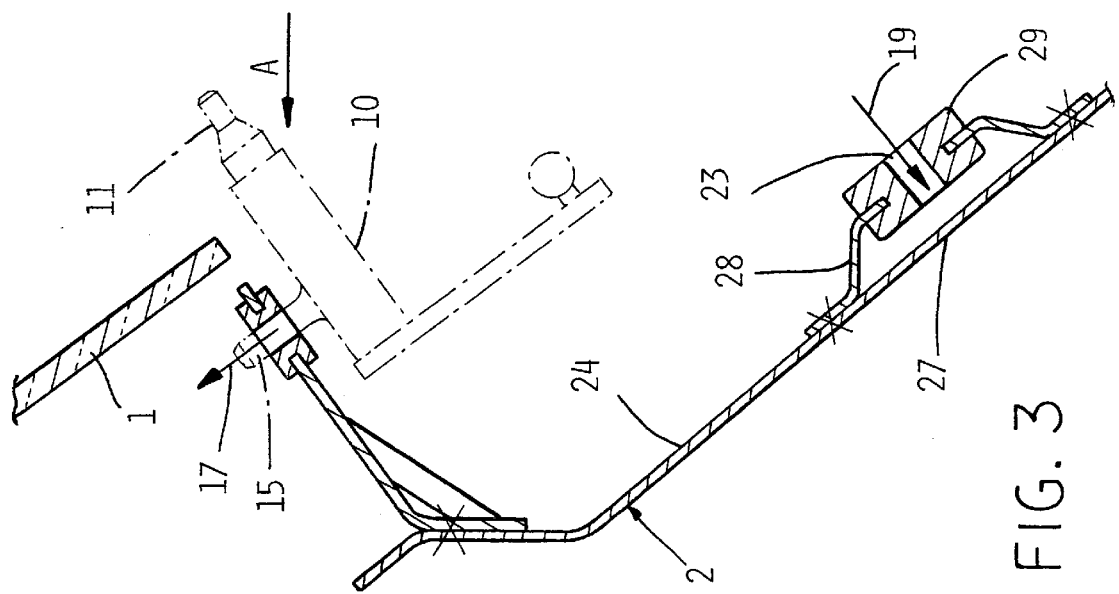
FIG. 3 shows a cross-section extending along the line III—III of FIG. 2 through an attachment point provided at the vehicle body, wherein the plug connection of an attachment member of the windshield wiper arrangement held at this attachment point is drawn in dash-dot form.

The windshield wiper arrangement shown in FIG. 1 comprises essentially a support structure 3, designated for attachment below the windshield 1 at a vehicle body 2 belonging to the motor vehicle, and a windshield wiper drive device 4 which is connected with the support structure 3. The essentially longitudinal support structure 3 comprises two support pipes 5 which are arranged at least approximately in the same longitudinal orientation and, respectively, with their inner end in the form of a shrink connection 6. The two support pipes are attached at the gear housing or the housing cover of a drive aggregate 7. Due to this support function, the drive aggregate 7 is thus to be understood as a part of the support structure 3. At the outer ends of the support pipes 5, via one additional shrink connection 8, respectively, a bearing 9, 10 is attached in which a wiper shaft 11 is rotatably mounted. The two wiper shafts 11 belong to the windshield wiper drive device 4 to which the drive aggregate 7 belongs as well. Not visible in FIG. 1, an operating crank is rigidly mounted on the drive shaft of the drive aggregate 7 which is movably connected with the two rods 12. The drive rods 12, in turn, are respectively movably connected with a rocker 13 which is rigidly attached at the wiper shaft 11. This windshield wiper drive arrangement 4, intended for the drive in the same direction of two windshield wipers, is thus formed by the drive aggregate 7, the drive crank, the two rods 12, the two rockers 13 and the two windshield wiper shafts 11.

It is now essential to the invention that the windshield wiper arrangement, formed from the two premounted structural groups, support structure 3 and windshield wiper drive device 4, can be attached on the vehicle body 2 by means of a non-screw type plug connection below the windshield 1 of the vehicle body. For this purpose, the three attachment members 14, 15, 16, which are in the form of cylindrical plug-in pegs 14, 15, 16, are provided at the support structure 3. The two attachment members 14 and 15 or the plug-in pegs 14 and 15 form a first number of attachment members 14, 15 and, respectively, are formed in one piece at the bearing 9 or 10 which is in the form of a cast part. For this purpose, the two plug-in pegs 14, 15 are arranged parallel to each other and are located, respectively, in a plane which is parallel to the windshield 1. Thus, the two pegs 14, 15 protrude from the bearings 9, 10 into a first identical direction 17 and are arranged at one longitudinal side of the support structure. The third plug-in peg 16 forming the second number of attachment members 16 is connected in one piece 18 with a part of a housing belonging to the drive aggregate 7. It is arranged at the opposite longitudinal side of the support structure 3 and there protrudes into a second direction 19 from the support structure. It is pointed out that the second direction 19 extends approximately at a right angle to the first direction 17, wherein the plug-in peg 16, when the windshield wiper arrangement is mounted on the vehicle with respect to the windshield 1 of the vehicle, protrudes from the support structure 3 approximately at a right angle and thus away from same. The angle between the first direction 17 and the second direction 19 can also be in a range of approximately 45° to approximately 135°.

The components of the holding forces effective in such a case are sufficient for a securely functioning mounting of the windshield wiper arrangement at the body 2 of the vehicle and the mounting or removal of the windshield wiper arrangement would not be made more difficult or hindered by such an arrangement. In this connection, the arrangement shown in FIG. 1 a of the third plug-in peg 16 with a thickened area 20 at the free end can be advantageous for securing the plug-in peg 16 in the axial direction. Since the plug-in pegs 14, 15, 16 are located on the corner points of a triangle, a stable support basis for the windshield wiper arrangement is formed.

Figure 2:
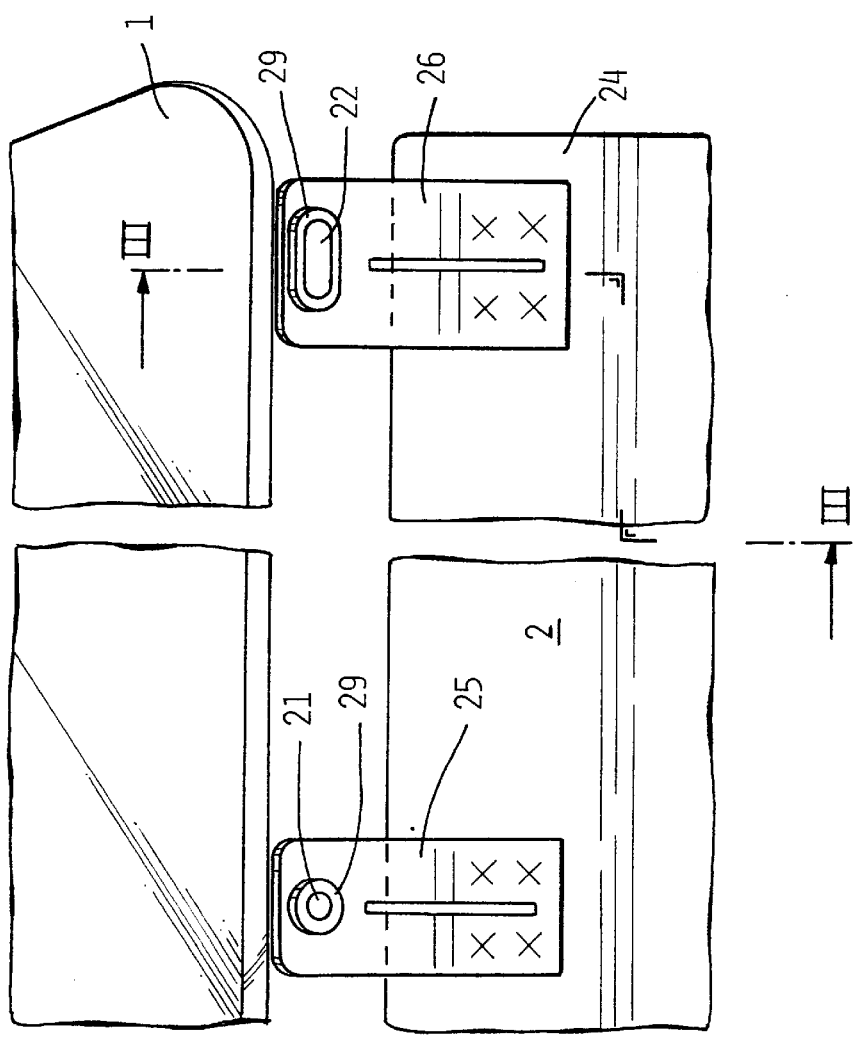
FIG. 2 shows a truncated view of three attachment points provided at the vehicle body for the plug-in mounting of the windshield wiper arrangement, as viewed in the direction of the arrow A of FIG. 3.

In the FIGS. 2 and 3, for the attachment of the windshield wiper arrangement shown in FIG. 1, at three attachment points of the vehicle body 2 which are adapted with respect to location, the receiving openings 21, 22 and 23 are provided which are formed for the purpose of receiving the attachment members 14, 15, 16 or the plug-in pegs 14, 15, 16. Hereof, for example, the receiving openings 21 and 22 each are provided respectively in one receiving bracket 25 or 26 plotted at a lateral distance from each other onto the support wall 24 belonging to the vehicle body 2, while the receiving opening 23, as shown in FIG. 3, is provided below and approximately in the middle between the receiving brackets 25, 26 of the support wall 24 in a holder 29 at a wall portion 27 which, for example, is approximately parallel to the windshield 1 and, as viewed in the direction of driving of the motor vehicle, is inclined diagonally below toward the front.

In order to equalize tolerances specific to the manufacture during the positioning of the upper receiving openings 21, 22, one of same, for example, the receiving opening 22 located on the right, is in the form of an elongated hole.

For decoupling, in accordance with the oscillations of the premounted windshield wiper arrangement from the vehicle body 2, the receiving openings 21, 22, 23 are provided in sleeves 29 made of rubber or another suitable elastic material which, in turn, are tied into appropriate openings of the parts 25, 26, 28.

As FIG. 1 shows, the plug-in peg 16 is, for example, formed by the free end piece of a cylindrical pin which is bent at a right angle. Also, any other structure and arrangement is conceivable; in particular, the plug-in peg 16 could also be directed upwardly. Both possible arrangements of the plug-in peg 16 assure that with the windshield wiper arrangement, as soon as its plug-in pegs 14, 15, 16 are made to engage the assigned receiving openings 21, 22, 23, the plug-in peg 16 forms a stop, by means of which an axial displacement and thus a release of the two other plug-in pegs 14, 15 from their receiving openings 21, 22 is reliably prevented.

As FIG. 1a shows, at the free end of the plug-in peg 16, a preferably conical thickened area 20 can be provided in order to secure same in the sleeve 29 by locking.

With respect to FIGS. 1–3, it is to be noted that the windshield wiper arrangement and the attachment points at the vehicle body 2 may be formed for the case wherein the windshield wiper arrangement can be mounted at the motor vehicle body 2 while turned by 180° about its central axis which extends diagonally. In this case, the plug-in peg 16 would be assigned to the first number of attachment members and would protrude into the first direction 17, while the other two plug-in pegs would be assigned to the second number of attachment members and would protrude into the second direction 19. The receiving openings 21, 22, 23 would have to be formed and assigned accordingly.

Additional arrangements can also be undertaken. For example, at the support structure 3 or at its opposing external sides, more attachment members than in the preceding example can be provided.

Furthermore, the windshield wiper arrangement may also be provided with only one bearing for a wiper shaft or with more than two bearings for respectively one wiper shaft. The support structure can also be a single structural part made of metal or a synthetic material and can be a cast part or a sheet metal part.

What is claimed is:

1. A windshield wiper arrangement for vehicles with a mounted support structure to which at least one bearing for a drivable wiper shaft is mounted, and with a windshield wiper drive arrangement to which a drive aggregate is coupled which is attached at the support structure and at least the one wiper shaft and a gear connecting the drive aggregate and at least one wiper shaft, wherein the support structure, for the secure attachment at the vehicle body has at least three attachment points which are at a distance from each other, of which two attachment points are located on a connection line and a third one is at a distance from the connection line, the attachment points being formed to create a cooperation with a corresponding number of attachment points at the vehicle body, characterized in that at all attachment points of the support structure, attachment members are provided which protrude from the support structure and which are formed, for the attachment of the windshield wiper arrangement, at the vehicle body only by insertion into the appropriately constructed receiving openings at the respective attachment points of the vehicle body for a secure attachment of the windshield wiper arrangement at the vehicle body.

2. A windshield wiper arrangement, in accordance with claim 1, characterized in that a first number of attachment members provided on the support structure protrudes in a first, identical direction from the support structure, while a remaining, second number of attachment members is provided on the support structure at a distance from the connecting line of the attachment members belonging to the first number of attachment members and extends from the support structure in a second identical direction extending at an angle between 45° and 135° with respect to the first direction.

3. A windshield wiper arrangement, in accordance with claim 2, characterized in that the first number of attachment members provided at the support structure, protrudes essentially diagonally with respect to the central longitudinal axis of at least one bearing for a wiper shaft from the support structure and that these attachment members extend in a plane which is essentially parallel to the vehicle windshield.

4. A windshield wiper arrangement, in accordance with claim 2, characterized in that the second number of attachment members lies in a plane which is essentially at a right angle to the vehicle windshield and, with respect to the vehicle windshield to be wiped, extends away from same.

5. A windshield wiper arrangement, in accordance with claim 1, characterized in that the attachment members provided at the support structure, are plug-in pegs having a cylindrical form.

6. A windshield wiper arrangement, in accordance with claim 1, characterized in that the attachment members are produced in one piece with the support structure.

7. A windshield wiper arrangement, in accordance with claim 2, characterized in that the first number of attachment members is provided at the one external side and the second number of attachment members is provided at the opposite external side of the support structure, wherein the first number of attachment members is provided at the one longitudinal side and the second number of attachment members is provided at the opposite longitudinal side of the support structure when the support structure of the windshield wiper arrangement has an elongated form.

8. A windshield wiper arrangement, in accordance with claim 2, characterized in that the first number of attachment members provided at the support structure, lies on a nearly straight connecting line, while the second number of attachment members is at a distance from the connecting line.

9. A windshield wiper arrangement, in accordance with claim 1, wherein the windshield wiper arrangement has a separately produced bearing for a wiper shaft, which bearings belong to the support structure, characterized in that an attachment member is provided at at least one of the bearings.

10. A windshield wiper arrangement, in accordance with claim 1, characterized in that at least one attachment member is provided at the drive aggregate and is formed in one piece with a housing part or a housing lid part of the drive aggregate.

11. A windshield wiper arrangement, in accordance with claim 2, characterized in that at the support structure, three attachment members are provided which rest essentially on the corner points of a triangle, of which two attachment members protrude into the first same direction from the support structure and the one remaining attachment member protrudes into the second direction from the support structure.

12. A windshield wiper arrangement, in accordance with claim 11, characterized in that the one remaining attachment member is provided in a central area between the other two attachment members and is preferably provided at the drive aggregate.

13. A windshield wiper arrangement, in accordance with claim 11, wherein the support structure of the windshield wiper arrangement includes two separately produced bearings for wiper shafts and at least one housing part of the drive aggregate, characterized in that at each of the two bearings, an attachment member is provided, wherein the two attachment members protrude diagonally to the axial direction of the bearings in the first same direction from the respective bearing, and in that the third attachment member is provided at least the one housing part of the drive aggregate and protrudes in the second direction.

14. A windshield wiper arrangement, in accordance with claim 2, characterized in that at least one attachment member of the second number of attachment members has a thickened area at its free end.

15. A windshield wiper arrangement, in accordance with claim 1, characterized in that at one of the support structure and at least one of the attachment members, a stop is provided which limits the entry path of the attachment member into the receiving opening.

16. A windshield wiper arrangement, in accordance with claim 1, characterized in that the form and size of a receiving opening provided at the vehicle body is adapted to the form and size of the attachment member assigned to it, and is in the form of a round aperture, while the at least one additional receiving opening at the vehicle body is the form of an elongated aperture which has a greater width in the direction toward the adjacent receiving opening.

17. A windshield wiper arrangement, in accordance with claim 16, characterized in that the receiving openings are respectively provided in a socket which is rigidly connected with the vehicle body and is formed of an oscillation-damping material.

* * * * *